(12) United States Patent
Inabata et al.

(10) Patent No.: US 9,766,265 B2
(45) Date of Patent: Sep. 19, 2017

(54) FLOW VELOCIMETER SYSTEM

(71) Applicant: HONDA MOTOR CO., LTD., Tokyo (JP)

(72) Inventors: Shinjiro Inabata, Saitama (JP); Yuichi Fukuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 414 days.

(21) Appl. No.: 14/560,104

(22) Filed: Dec. 4, 2014

(65) Prior Publication Data

US 2015/0177269 A1  Jun. 25, 2015

(30) Foreign Application Priority Data

Dec. 25, 2013  (JP) .................................. 2013-268010

(51) Int. Cl.
  *G01P 21/02* (2006.01)
  *G01P 5/22* (2006.01)

(52) U.S. Cl.
  CPC .............. *G01P 21/025* (2013.01); *G01P 5/22* (2013.01)

(58) Field of Classification Search
  CPC .................................. G01P 3/36; G01N 21/00
  USPC .................................................. 356/28, 28.5
  See application file for complete search history.

(56) References Cited

U.S. PATENT DOCUMENTS 4,919,536 A * 4/1990 Komine .................. G01P 5/001
  356/28
5,491,642 A * 2/1996 Wormell ................ G01P 5/001
  356/28

FOREIGN PATENT DOCUMENTS

| JP | 10-123163 A | * 10/1996 | ................ G01P 5/20 |
|---|---|---|---|
| JP | 10-123163 A | 5/1998 | |
| JP | 2001-074415 A | 3/2001 | |
| JP | 2004-020385 A | 1/2004 | |
| JP | 2011-063098 A | 3/2011 | |
| JP | 2013-088336 A | 5/2013 | |

OTHER PUBLICATIONS

Translation for JP10-123163 A.*
Japanese Office Action application No. 2013-268010 dated Apr. 26, 2016.

* cited by examiner

*Primary Examiner* — Luke Ratcliffe
(74) *Attorney, Agent, or Firm* — Squire Patton Boggs (US) LLP

(57) ABSTRACT

While a light sheet is generated at a designated region, images of fluid flowing through the designated region are formed at different times. For an inspection region of the plurality of inspection regions defined in the images that has a degree of difference exceeding a threshold between the local flow velocity vector $v(a, b, T)$ at a certain time T and a reference flow velocity vector $v(a, b, T_{\pm})$ at times $T_{\pm}$ that are different from the certain time T, the flow velocity vector $v(a, b, T)$ at the reference time T is corrected with the reference flow velocity vector $v(a, b, T_{\pm})$.

4 Claims, 14 Drawing Sheets

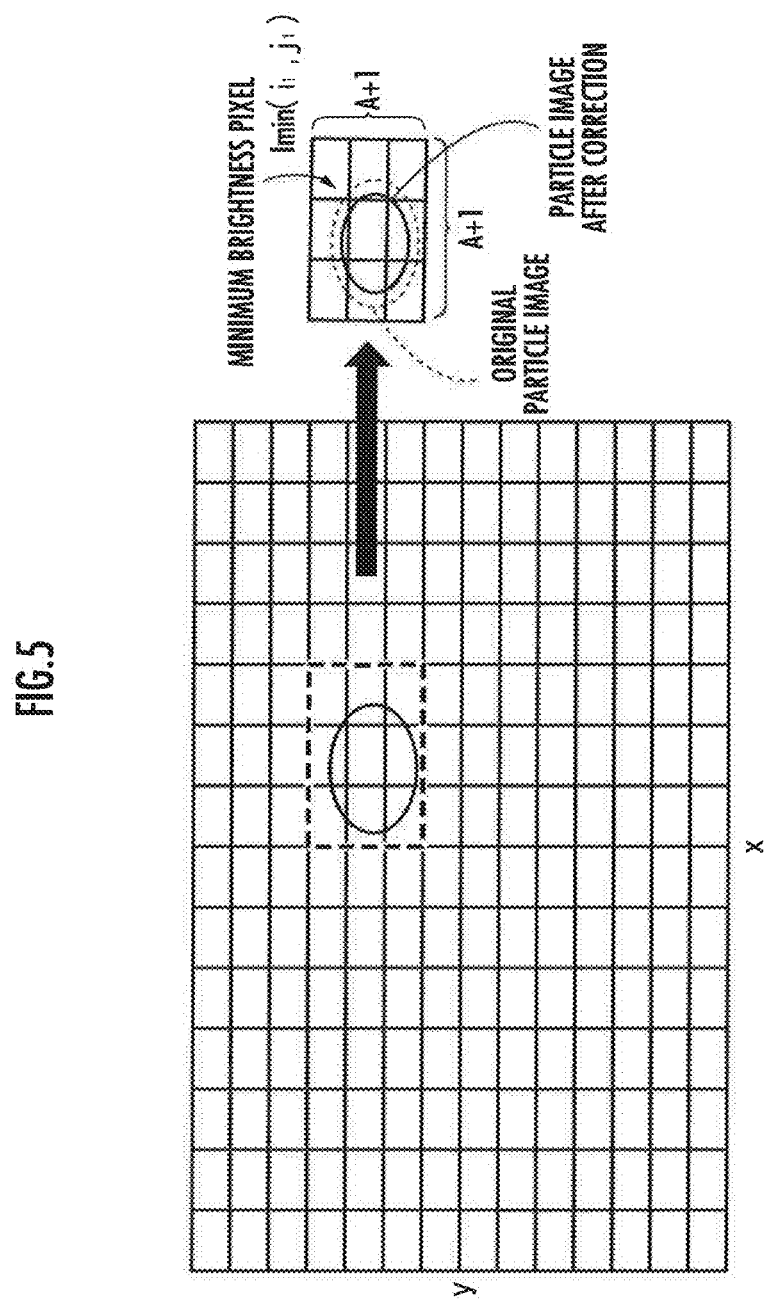

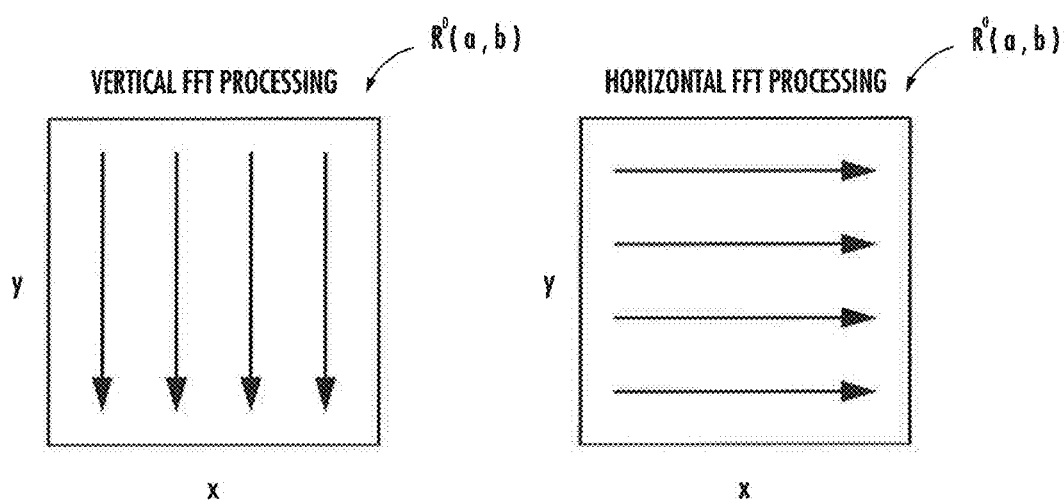

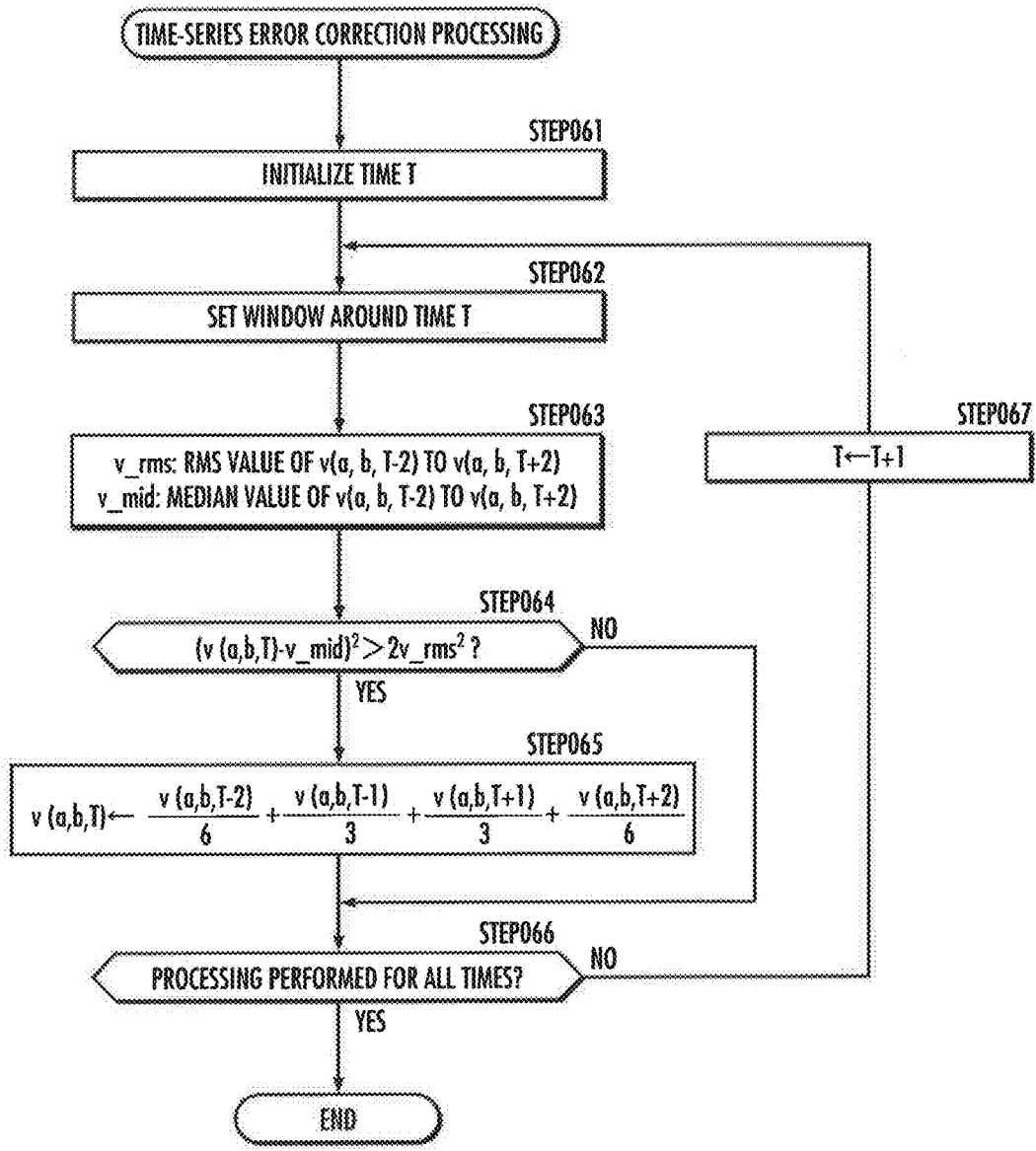

FLOW VELOCIMETER SYSTEM

BACKGROUND OF THE INVENTION

Field of the Invention

The present invention relates to flow velocimeter systems.

Description of the Related Art

Known flow velocimetry includes a particle image velocimeter (hereinafter called a PIV) that is configured to irradiate small particles mixed in fluid with light such as laser light to acquire an image of scattered light therefrom, thus finding a moving distance of a particle or a group of particles from images of particles acquired at slightly different times and so measuring the velocity of fluid (flow velocity) in the two-dimensional plane.

In the velocity field of the PIV, vectors (noise) having a very large error are present. Such noise is generated because particles flow out from or into a light sheet due to the velocity component perpendicular to the light sheet or the voracity component, thus failing to find a correlation between the images. Such generation of the noise cannot be avoided, meaning that the velocity obtained includes a very large error.

To solve such a problem, Japanese Patent Application Laid-Open No. 2004-20385 (Patent Document 1) proposes a technique of performing Fourier transformation of a time-series velocity at each velocity defining point in flow velocity vector distributions acquired from two images that are temporally continuous, to which cutoff filtering or low-pass filtering is applied in the frequency space for inverse Fourier transformation, thus obtaining a final time-series velocity of the fluid.

SUMMARY OF THE INVENTION

Such a conventional technique, however, is configured to perform processing such as Fourier transformation to a time-series velocity at each velocity defining point as one continuous function, and so has to be modified better from the viewpoint of improving the accuracy to acquire the time-series velocity of the fluid, because while an error at a noise part having a large error can be decreased, but an error at a flow velocity vector part having a small error increases unfortunately.

Then the present invention aims to provide a system for PIV that is capable of improving the measurement accuracy of time-series or changing mode of the fluid velocity.

A flow velocimeter system of the present invention comprises: a light-sheet generation device; an imaging device; and an image analysis device including a processor, the image analysis device being configured to measure, based on images of fluid flowing through a designated region that are formed a plurality of times at different times by the imaging device while the light-sheet generation device generates a light sheet continuously or intermittently at the designated region, a time-series changing mode of a local flow velocity vector of the fluid at each of a plurality of inspection regions defined at the images in accordance with a cross correlation method. The image analysis device is configured to, for an inspection region of the plurality of inspection regions that has a degree of difference exceeding a threshold between the flow velocity vector at a certain time and a reference flow velocity vector as the flow velocity vectors at one or a plurality of times that is different from the certain time, correct the flow velocity vector at the certain time with the reference flow velocity vector.

According to the flow velocimeter system of the present invention, a light sheet is generated at the designated region, and images of fluid flowing through the designated region are formed at a plurality of different times. For each of a plurality of inspection regions making up the images, when a flow velocity vector at a certain time is different from a flow velocity vector (reference flow velocity vectors) at one or a plurality of times that is different from the certain time beyond a threshold, the flow velocity vector at the certain time is corrected. As a result, a flow velocity vector that is likely to be noise different from the original form can be corrected closer to the original form. Then, the accuracy of measurement of time-series or changing mode of the fluid velocity can be improved.

In the flow velocimeter system in one aspect of the present invention, the image analysis device is configured to correct brightness of all pixels making up a predetermined range that is at least a part of the images based on brightness of a pixel as a part making up the predetermined range, and then calculate a flow velocity vector at each of the plurality of inspection regions.

According to the thus configured flow velocimeter system, brightness of all pixels making up a predetermined range that is at least a part of the formed image is corrected. This enables clear discrimination of the brightness resulting from the border between particles included in the fluid or making up the fluid and the background light and the brightness resulting from the scattered light of the particles. That is, the measurement accuracy of a time-series correlation of the region including the particles in the formed image can be improved, and accordingly the time-series measurement accuracy of the fluid velocity can be improved.

In the flow velocimeter system of the present invention, the image analysis device is configured to execute fast Fourier transformation processing at each of the plurality of inspection regions, thus calculating the flow velocity vectors, and when there is an overlapped region in one inspection region and in another inspection region among the plurality of inspection regions, to apply a result of the fast Fourier transformation processing at the other inspection region to the overlapped region for the fast Fourier transformation at the one inspection region.

According to the thus configured flow velocimeter system, the calculation resource can be saved for the fast Fourier transformation processing (FFT processing) in the overlapped region between the plurality of inspection regions. This means that the fluid velocity having a high pixel density of the image also can be measured effectively in a time-series manner, and so the measurement accuracy can be further improved.

In the flow velocimeter system of the present invention, the image analysis device uses a value that is determined in accordance with the reference flow velocity vector as the threshold.

According to the thus configured flow velocimeter system, the threshold can be determined adaptively corresponding to the reference flow velocity vector, and so the time-series measurement accuracy of the fluid velocity can be further improved.

In the flow velocimeter system of the present invention, the image analysis device is configured to, when occupancy of different flow velocity vectors among the reference flow velocity vectors at the plurality of times exceeds a predetermined value, increase the number of the reference flow velocity vectors so that the occupancy becomes the predetermined value or less. The different flow velocity vectors are reference flow velocity vectors at one time of the plurality of times, which have a degree of difference from reference flow velocity vectors at another time that exceeds the threshold.

According to the thus configured flow velocimeter system, the number of reference flow velocity vectors (imaging times) are increased as needed so as to reduce the influences from reference flow velocity vectors that are likely to correspond to noise. Then, the flow velocity vector at each time can be corrected suitably based on the reference flow velocity vector that is likely not to correspond to noise or to correspond to the true value, and so the time-series measurement accuracy of the fluid velocity can be improved.

BRIEF DESCRIPTION OF THE DRAWINGS

FIG. 5 describes particle image correction processing.

FIG. 9 describes the brightness distribution at each inspection region and FFT processing to be performed for the brightness distribution.

FIG. 11 is a flowchart of time-series error correction processing.

DESCRIPTION OF THE PREFERRED EMBODIMENTS (Configuration of Flow Velocimeter System)

Figure 1:
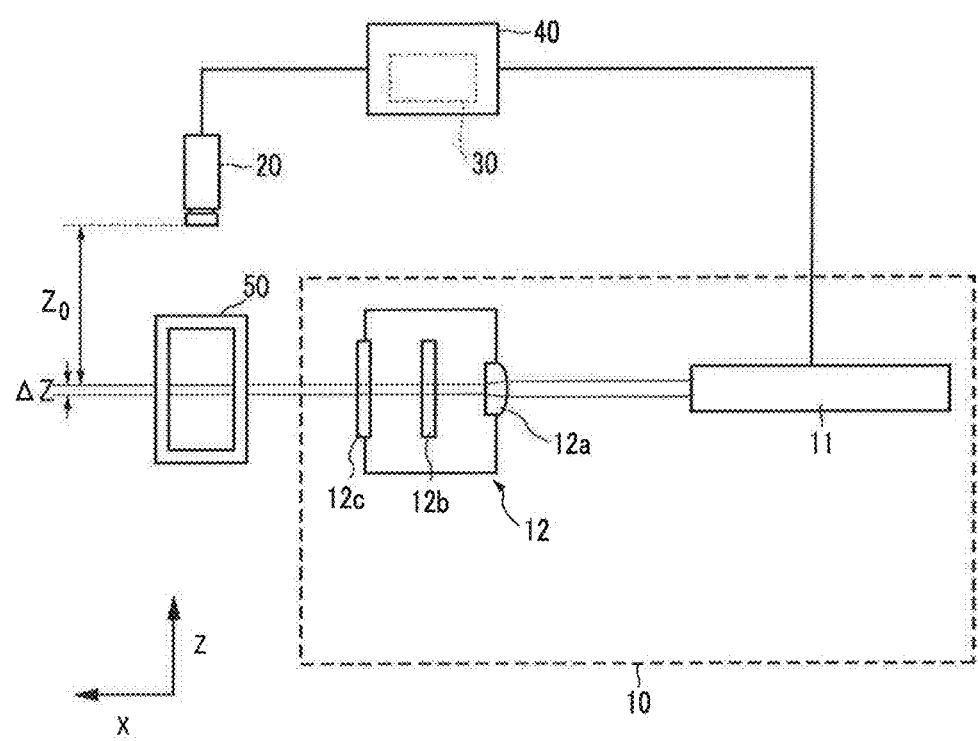
FIG. 1 schematically illustrates the system as a whole.

A flow velocimeter system that is one embodiment of the present invention illustrated in FIG. 1 is to measure a moving mode of fluid flowing through a test section 50 (designated region). The flow velocimeter system is used for designing and development of a moving body such as a vehicle, to measure a moving mode of fluid around the moving body, for example. The flow velocimeter system includes a light-sheet generation device 10, an imaging device 20, an image analysis device 30 and a control unit 40.

The light-sheet generation device 10 includes a light source 11 and an optical system 12 to form sheet-form light (light sheet) at the test section 50. The light source 11 is configured to generate light (electromagnetic waves) such as laser light. The optical system 12 is configured so that light generated from the light source 11 is converted into sheet-form light, and then is applied at the test section 50. The optical system 12 includes a first cylindrical lens 12$a$, a second cylindrical lens 12$b$ and an output window 12$c$.

The imaging device 20 has an optical axis that is disposed to be orthogonal to the light sheet (laser light sheet) formed at the test section 50. The imaging device 20 forms an image of a group of particles included in the fluid flowing through the test section 50 intermittently. Each of a plurality of pixels making up the image formed has a brightness resulting from the scattered light of the particles at the light sheet, for example, as a pixel value.

The image analysis device 30 includes a computer (made up of an arithmetic processing unit or one or a plurality of processors (CPU), a memory (storage device), an I/O circuit and the like). The image analysis device 30 receives data of an image formed by the imaging device 20, and executes arithmetic processing for analysis of the image. The processor making up the image analysis device 30 reads necessary data and such software from the memory, and executes arithmetic processing to the data in accordance with the software.

Figure 2:
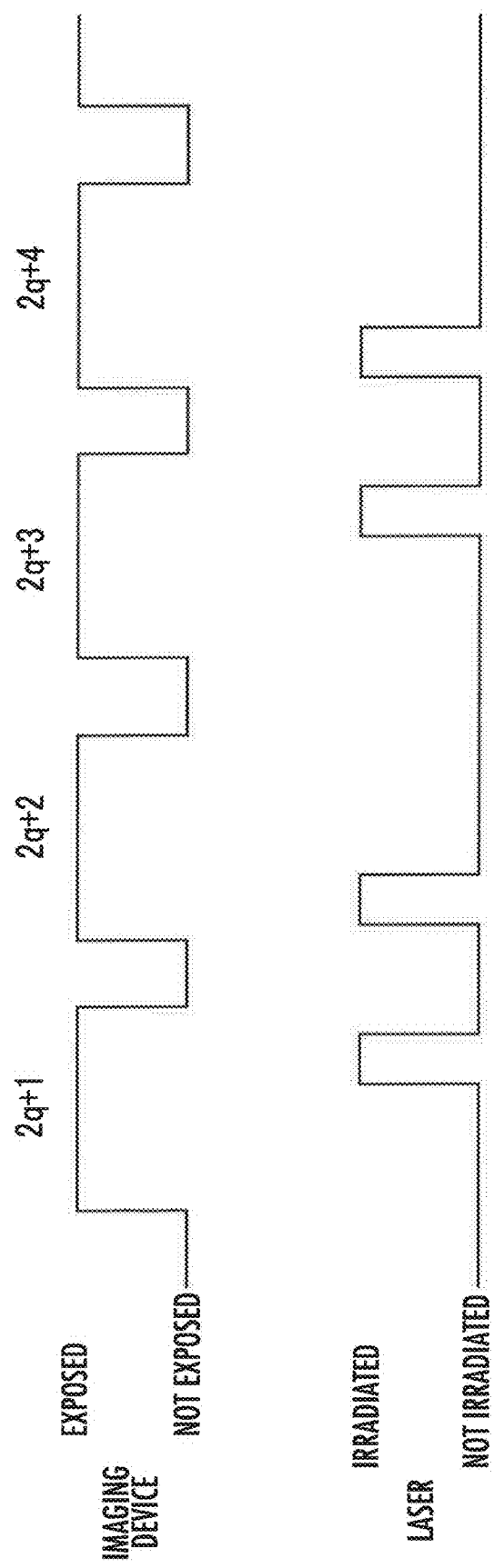
FIG. 2 illustrates the relationship between the exposure duration of an imaging device and timing of laser irradiation.

The control unit 40 includes a computer that is common to the computer making up the image analysis device 30 or that is different from the computer. A generation timing of a light sheet by the light-sheet generation device 10 and an imaging timing by the imaging device 20 are synchronized by various synchronization methods suitable for the type of the light source 11. As illustrated in FIG. 2, the control unit 40 controls the light-sheet generation device 10 to intermittently generate a light sheet at the end of the exposure duration of the odd number of times by the imaging device 20 (2q+1-th, 2q+3-th, where q is an integer) and at the beginning of the exposure duration of the even number of times (2q+2-th, 2q+4-th). Such intermittent duration is adjusted so that the standard moving amount of a target at the formed image becomes about a predetermined number of pixels (e.g., 5 pixels).

The test section 50 is defined with a pipe having a rectangular cross section that is made of transparent acrylic, where the distance from the lens making up the imaging device 20 to the irradiation face of the light sheet is set at $Z_0$. Fluid (air) including particles mixed therein beforehand is allowed to flow through the inside of the pipe. Light at the light sheet is scattered by the particles, whereby an image of particles including pixels having a brightness resulting from the scattered light can be acquired.

An image of an independent particle at the image of particles is called a "particle image". An image of a group of particles made up of collected particles at the image of particles is called a "particle group image". A three-dimensional orthogonal coordinate system (coordinate system defined with X-axis and Y-axis that are parallel to the light sheet and Z-axis that is perpendicular to the light sheet) representing the location of a particle group at the test section 50 is called a "real-space coordinate system". A two-dimensional orthogonal coordinate system (coordinate system defined with x-axis and y-axis that are parallel to the image-forming plane) representing the location of a particle group, for example, in the particle image is called an "image coordinate system".

Herein, the relationship between the coordinate (X, Y, Z) in the real-space coordinate system and the coordinate (x, y) in the image coordinate system is represented by the following Expressions (1) to (3) using the magnification of the imaging M:

$$x = \frac{X}{M} \quad (1)$$

$$y = \frac{Y}{M} \quad (2)$$

$$Z_0 - \frac{\Delta Z}{2} \leq Z \leq Z_0 + \frac{\Delta Z}{2} \quad (3)$$

The location of each pixel of the formed image is represented with a pixel coordinate (i, j) having a one-to-one correspondence to each pixel. Then, i, j is converted in to x, y as stated above based on the size of each pixel, followed by conversion with Expressions (1) to (2), whereby the location in the real space corresponding to each pixel (i, j) can be found. Brightness of each pixel is represented as I(i, j).

(Functions of Flow Velocimeter System)

Figure 3:
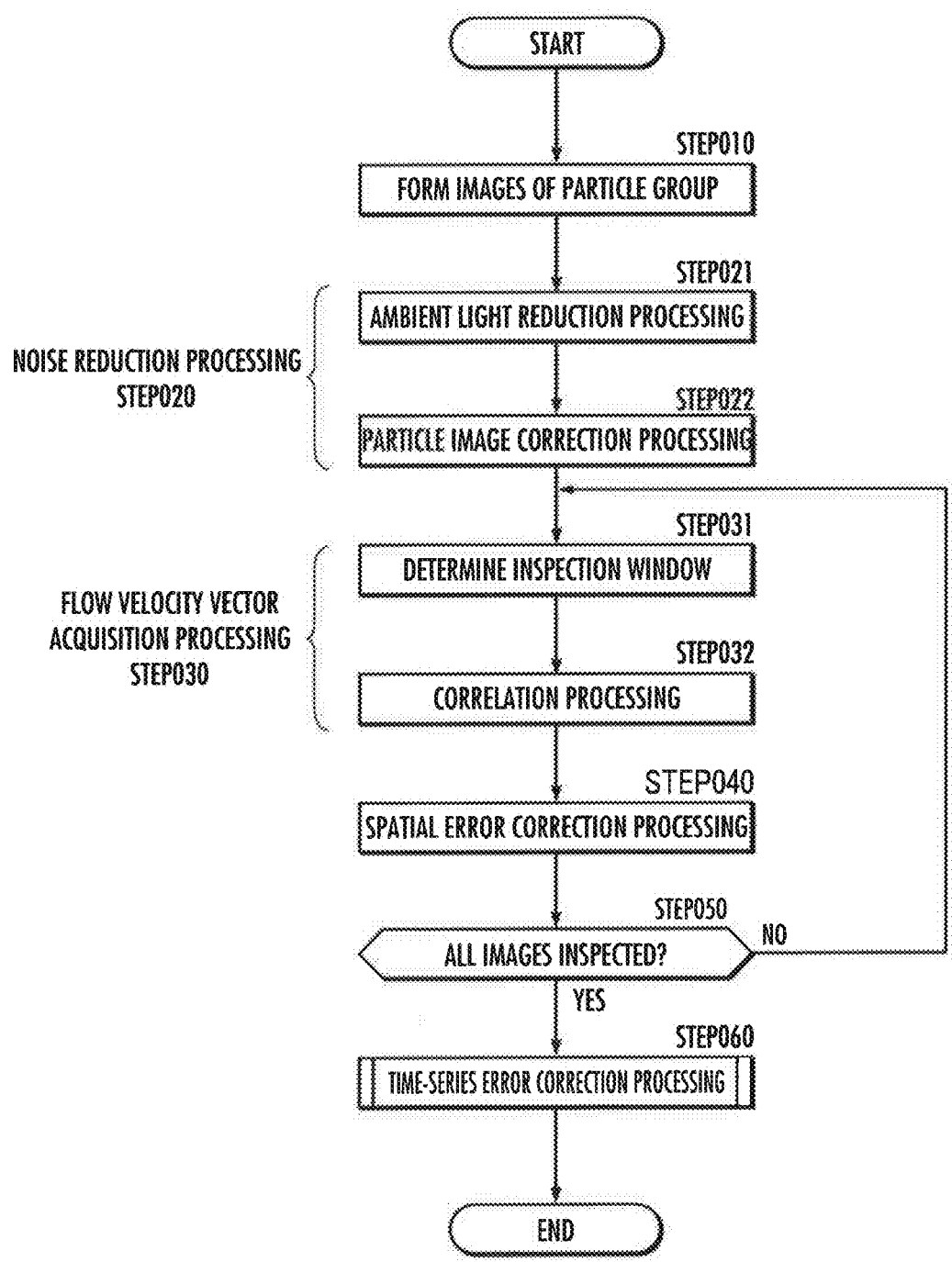
FIG. 3 is a flowchart to acquire a time-series velocity of fluid.

Referring to FIG. 3, the following describes the outline of functions of the flow velocimeter system.

The imaging device 20 forms an image of a particle group flowing through the test section 50 intermittently (FIG. 3/STEP010). The formed image includes high-brightness pixels resulting from the scattered light of the particle group at the light sheet that is formed at the test section 50, and the existence of the particles is represented by such a part of the high-brightness pixels. Herein, the time interval of the intermittent imaging is adjusted to enable the observation of a moving mode of each particle group at the test section 50.

The image analysis device 30 executes noise reduction processing to each formed image (FIG. 3/STEP020). The noise reduction processing includes ambient light reduction processing (FIG. 3/STEP021) and particle image correction processing (FIG. 3/STEP022).

The processing to reduce the influence from ambient light (FIG. 3/STEP021) yields a subtraction image that is a result of the subtraction of a pixel value of each pixel making up a background image from a pixel value (brightness) of each pixel making up the formed image at each time. The "background image" means an image at the test section 50 that is formed by the imaging device 20 when a light sheet is formed there but there are no particles. This can reduce the influence of ambient light (e.g., reflected light from a body of the vehicle) from the formed image at each time.

The particle image correction processing (FIG. 3/STEP022) corrects the brightness of all pixels making up a predetermined range that is at least a part of the formed image based on the brightness of a part of pixels making up the predetermined range to correct the size of the image of each particle group image. Specifically the minimum value of the brightness is subtracted from the brightness of pixels making up the predetermined range.

Figure 4:
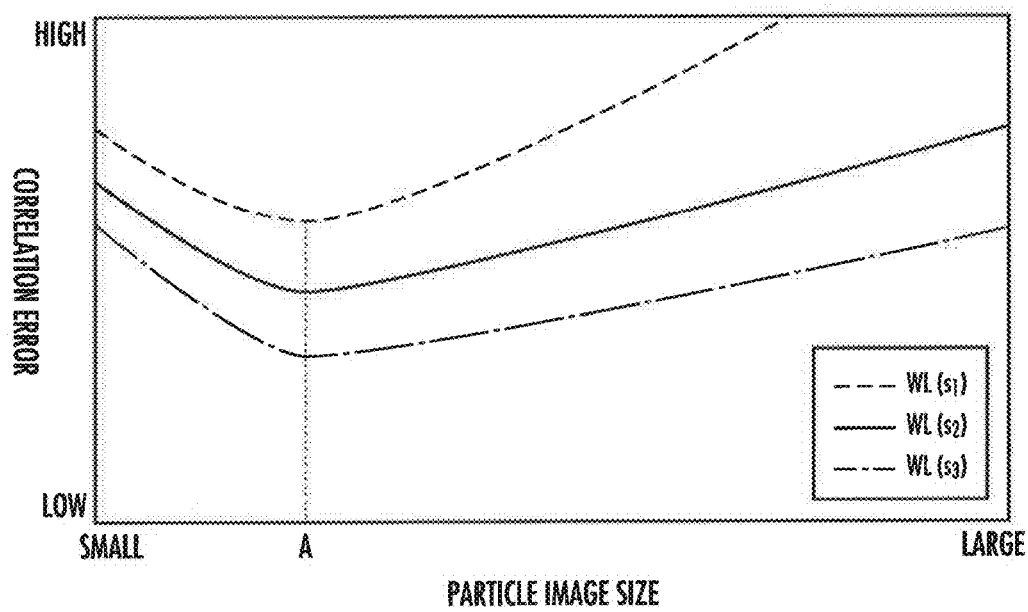
FIG. 4 illustrates the relationship between the image size of a particle and an error of cross correlation.

FIG. 4 shows the relationship between the size of a particle image (particle image size) used when the PIV processing is executed to each particle image at different times that are created artificially using random numbers and an error (average) for the correct value of the correlation value between inspection regions defined for the particle images at the different times. The "inspection region" is defined with the inspection window used at the local flow velocity vector acquisition processing (FIG. 3/STEP030) described later. The horizontal axis represents the particle image size in the units of pixels of the image. The vertical axis represents the corresponding correlation value error (average). In three cases having difference widow lengths WL(s) of the inspection window (WL(s1)<WL(s2)<WL(s3)), the curves on the relationship between the image size and the correlation value error are represented with the broken line, the solid line and the dot-and-dash line. Typically a larger window length WL(s) of the inspection window means a smaller correlation value error between the inspection regions define with such an inspection window.

As can be seen from FIG. 4, the correlation value error between inspection regions becomes the minimum when the particle image size is about A pixel, irrespective of the window length WL(s). The "A pixel" is 2-pixel plus for the cross correlation based on two images, for example. Presumably a too large particle image size makes it difficult to distinguish the particle image and the edge because the edge (border region) of one pixel image overlaps with the edge of another particle image.

As illustrated in FIG. 5, the particle image correction processing (FIG. 3/STEP022) subtracts the minimum brightness $I_{min}(i_1, j_1)$ at the (A+1)×(A+1) pixels from the brightness I(i,j) of the pixels included in the predetermined range having the size of (A+1)×(A+1) pixels (e.g., 3×3 pixels). This results in the brightness at the edge of the particle image to be zero (reference value), and so as illustrated in FIG. 5, the original particle image size indicated with the broken line is corrected to be a particle image size (about A×A pixels) indicated with the solid line. This can minimize the correlation value error between inspection regions that are defined in particle images at different times, and accordingly leads to the improvement of measurement accuracy of the flow velocity vector.

Figure 6A:
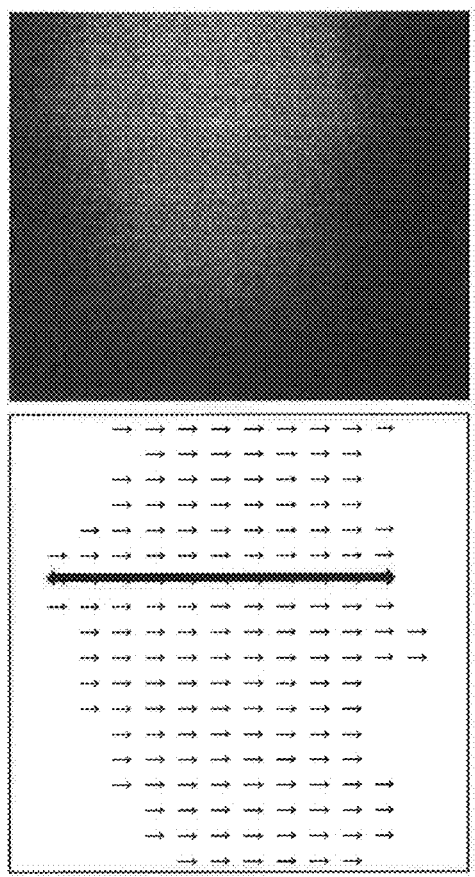
FIG. 6A illustrates the range where flow velocity vectors can be acquired when the particle image correction processing is not performed.
Figure 6B:
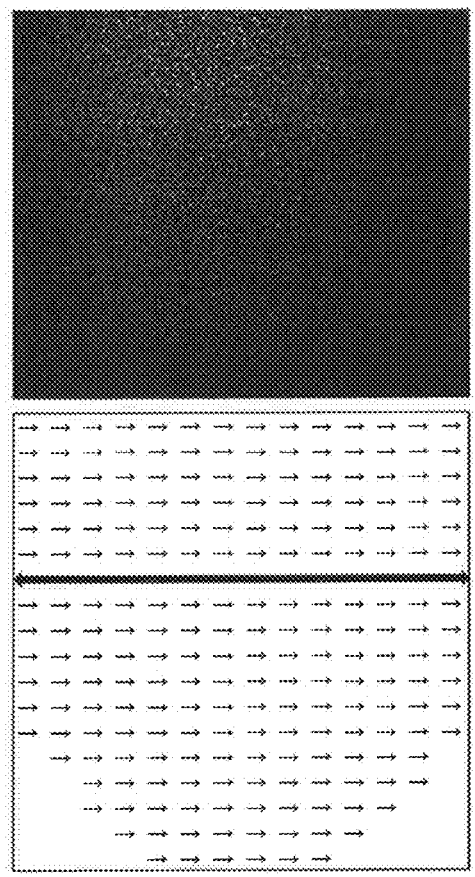
FIG. 6B illustrates the range where flow velocity vectors can be acquired when the particle image correction processing is performed.

Specifically if the particle image correction processing is omitted, the outline of each particle becomes blurred as illustrated in the upper part of FIG. 6A. This makes the range in the formed image for acquisition of the flow velocity vector at the flow-velocity vector acquisition processing (FIG. 3/STEP030) relatively narrower as illustrated in the lower part of FIG. 6A. On the other hand, when the particle image correction processing is executed, then the outline of each particle image formed becomes clear as illustrated on the upper side of FIG. 6B. This means that the range in the formed image for acquisition of the flow velocity vector at the flow-velocity vector acquisition processing (FIG. 3/STEP030) becomes relatively wider as illustrated on the lower side of FIG. 6B. Herein not the brightness minimum value but the brightness average of all pixels included in the predetermined range may be subtracted from the brightness of the pixels included in the predetermined range.

Following the noise reduction processing (FIG. 3/STEP20), the image analysis device 30 performs processing to acquire the flow velocity vector v(a, b, T) from a plurality of images formed based on the correlation relationship between a first inspection region included in a first image at a first time T and a second inspection region included in a second image at a second time T+ΔT (FIG. 3/STEP030). The time ΔT is a small time (e.g., intermittent imaging time interval), and the first image and the second image are two images that are continuous in terms of clock time, for example.

Figure 7A:
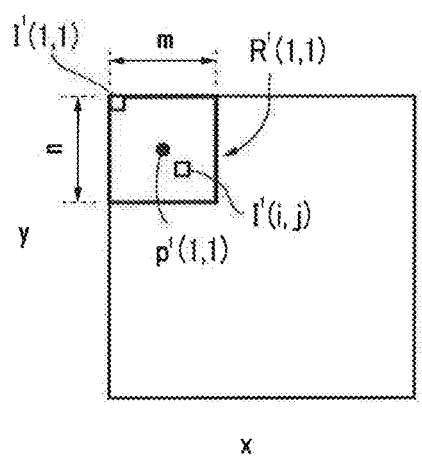
FIG. 7A describes a first inspection region located at the upper left corner.

Herein as illustrated in FIG. 7A, the brightness of the pixels included in the first image is represented as $I^1(i,j)$ using the superscript number 1, the pixel coordinate value i of the pixel in x-axis direction and the pixel coordinate value j of the pixel in y-axis direction. Then as illustrated in FIG. 7A, the brightness of the pixels included in the second image is represented as $I^2(i,j)$ using the superscript number 2 and the pixel coordinates (i, j) of the pixel. When the types of the image such as the first image and the second image are not distinguished, it is simply represented as $I(i,j)$.

In the first image, a plurality of first inspection regions $R^1(a,b)$ are defined. Herein, "a" denotes an index value indicating how they are displaced in the x-axis direction with reference to the inspection region located at the upper left corner of the first image. Then "b" denotes an index value indicating how they are displaced in the y-axis direction with reference to the inspection region located at the upper left corner of the first image. As illustrated in the range surrounded with the bold line in FIG. 7A, any first inspection region $R^1(a,b)$ is a rectangle or a square of m pixels horizontally (x-axis direction) and n pixels vertically (y-axis direction).

For each of the first inspection regions $R^1(a,b)$, one first velocity defining point $p^1(a,b)$ is defined inside or on the border of the region. The first velocity defining point $p^1(a,b)$ is located with reference to the first inspection regions $R^1(a,b)$ at a constant position (e.g., the center of the region) irrespective of the difference of the index value (a,b). The first velocity defining point $p^1(a,b)$ becomes one of the reference points to calculate the flow velocity vector $v(a, b, T)$. One velocity defining point and another velocity defining point adjacent to the one velocity defining point are distant by $d_x$ (or $d_y$) pixels in the x-axis direction (or in the y-axis direction).

Next, referring to FIGS. 7A to 7D, the distribution of brightness at each first inspection region is described below. The distribution of brightness at the first inspection region $R^1(1,1)$ located at the left upper corner of the first image can be represented by the following Expression (4) using the brightness of pixels included in the first inspection region $R^1(1,1)$.

$$I^1(i,j) \text{ where } 1 \le i \le m, 1 \le j \le n \qquad (4)$$

At the first inspection region $R^1(1, 1)$, one first velocity defining point $p^1(1,1)$ is defined.

Figure 7B:
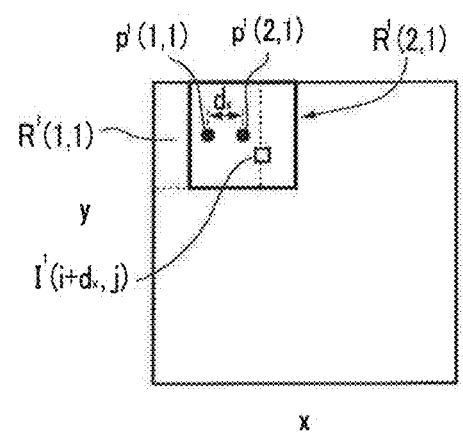
FIG. 7B describes the first inspection region that is displaced by one in the x-axis direction.

For instance, as illustrated in FIG. 7B, a first velocity defining point $p^1(2,1)$ that is adjacent to the first velocity defining point $p^1(1,1)$ in the x-axis positive direction is distant from the first velocity defining point $p^1(1,1)$ by $d_x$ pixels in the x-axis positive direction. That is, the distribution of brightness at the first inspection region corresponding to the first velocity defining point $p^1(2,1)$ is represented by Expression (5).

$$I^1(i+d_x,j) \text{ where } 1 \le i \le m, 1 \le j \le n \qquad (5)$$

Figure 7C:
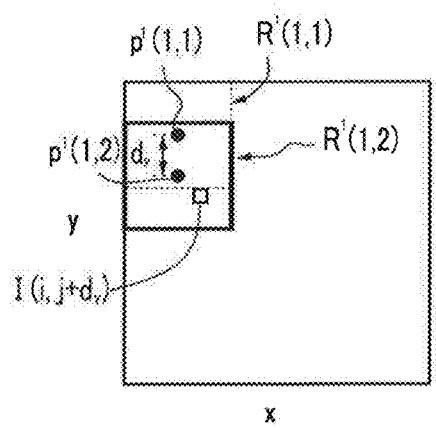
FIG. 7C describes the first inspection region that is displaced by one in the y-axis direction.

Then as illustrated in FIG. 7C, a first velocity defining point $p^1(1,2)$ that is adjacent to the first velocity defining point $p^1(1,1)$ in the y-axis positive direction is distant from the first velocity defining point $p^1(1,1)$ by $d_y$ pixels in the y-axis positive direction. That is, the distribution of brightness at the first inspection region corresponding to the first velocity defining point $p^1(1,2)$ is represented by Expression (6).

$$I^1(i,j+d_y) \text{ where } 1 \le i \le m, 1 \le j \le n \qquad (6)$$

Figure 7D:
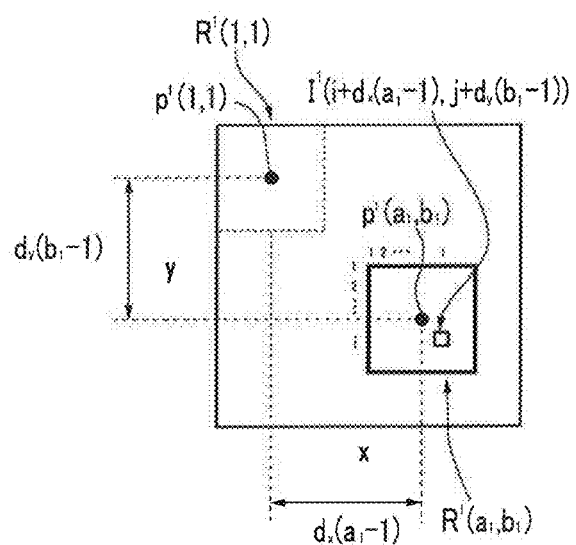
FIG. 7D describes a typical first inspection region.

As illustrated in FIG. 7D, a first velocity defining point $p^1(a_1,b_1)$ is distant from the first velocity defining point $p^1(1,1)$ by $d_x(a_1-1)$ pixels in the x-axis positive direction and by $d_y(b_1-1)$ pixels in the y-axis positive direction. That is, the distribution of brightness at the first inspection region corresponding to the first velocity defining point $p^1(a_1,b_1)$ is represented by Expression (7).

$$I^1(i+d_x(a_1-1),j+d_y(b_1-1)) \text{ where } 1 \le i \le m, 1 \le j \le n \qquad (7)$$

Figure 8A:
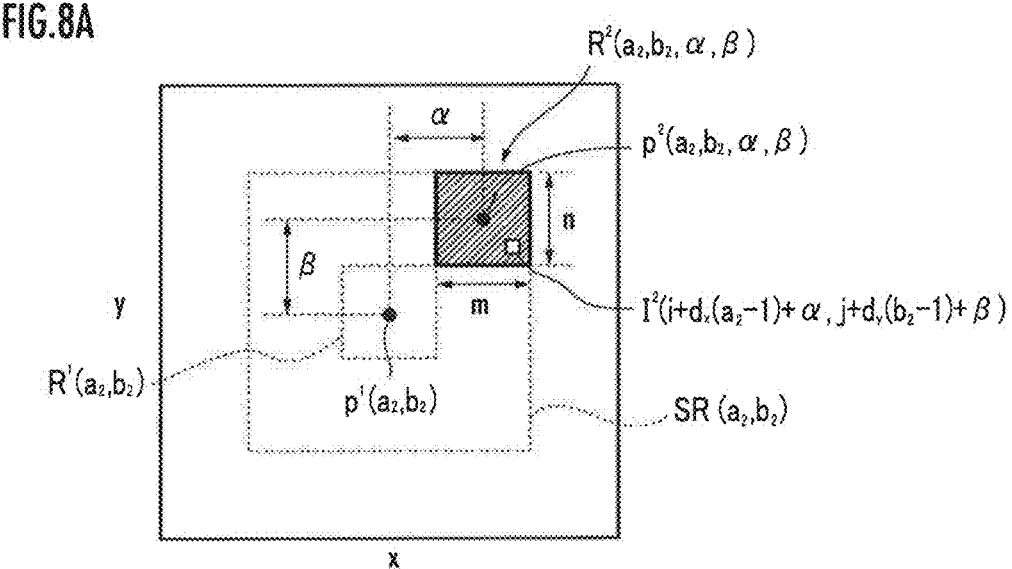
FIG. 8A describes a second inspection region.

In the second image, a plurality of second inspection regions $R^2(a,b,\alpha,\beta)$ are defined corresponding to the plurality of first inspection regions $R^1(a,b)$ defined in the first image. Herein "a" and "b" are the same index values as "a" and "b" of the first inspection region $R^1(a,b)$. As illustrated in FIG. 8A, "α" is an index value indicating the distance between a first inspection region $R^1(a,b)$ as a target and a second inspection region $R^2(a,b,\alpha,\beta)$ in the x-axis direction (precisely the distance between the first velocity defining point $p^1(a,b)$ and a second velocity defining point $p^2(a,b,\alpha,\beta)$ described later in the x-axis direction) in the units of pixels. As illustrated in FIG. 8A, "β" is an index value indicating the distance between a first inspection region $R^1(a,b)$ as a target and a second inspection region $R^2(a,b,\alpha,\beta)$ in the y-axis direction (precisely the distance between the first velocity defining point $p^1(a,b)$ and the second velocity defining point $p^2(a,b,\alpha,\beta)$ described later in the y-axis direction) in the units of pixels. When the first inspection region $R^1(a,b)$ and the second inspection region $R^2(a,b)$ are not distinguished, they are represented as an inspection region $R^0(a,b)$ using R, the index values a, b and the superscript number 0.

Each of the second inspection regions $R^2(a,b,\alpha,\beta)$ has the same shape and size as those of the first inspection region $R^1(a,b)$. That is, each of the second inspection regions $R^2(a,b,\alpha,\beta)$ is a rectangular or square-shaped region of m pixels horizontally (x-axis direction) and n pixels vertically (y-axis direction).

For each of the second inspection regions $R^2(a,b,\alpha,\beta)$, one second velocity defining point $p^2(a,b,\alpha,\beta)$ is defined inside or on the border of the region. The second velocity defining point $p^2(a,b,\alpha,\beta)$ is located with reference to the second inspection regions $R^2(a, b)$ at a constant position (e.g., the center of the region) irrespective of the difference of the index value $(a,b,\alpha,\beta)$. The first inspection region $R^1(a,b)$ and the first velocity defining point $p^1(a,b)$ have the same positional relationship as that of the second inspection region $R^2(a,b,\alpha,\beta)$ and the second velocity defining point $p^2(a,b,\alpha,\beta)$. Such a second velocity defining point $p^2(a,b,\alpha,\beta)$ becomes one of the reference points to calculate the flow velocity vector $v(a, b, T)$.

As indicated with the range surrounded with the bold line in FIG. 8A, the second inspection region $R^2(a,b,\alpha,\beta)$ is a region of m pixels horizontally (x-axis direction) and n pixels vertically (y-axis direction) in size in the second image.

The distribution of brightness at the second inspection region $R^2(a, b,\alpha,\beta)$ is represented by Expression (8).

$$I^2(i+dx(\alpha-1)+\alpha,j+d(b-1)+\beta) \text{ where } 1 \le i \le m, 1 \le j \le n \qquad (8)$$

For more detailed descriptions of the processing at STEP030, the flow velocimeter system determines the size m, n of the inspection region by the image analysis device 30 (FIG. 3/STEP031).

The flow velocimeter system increases m and n (e.g., m=64, n=64) at the time of starting of the processing to perform correlation processing at STEP032 in a wider range. Then as the processing proceeds, the flow velocimeter system calculates the maximum movement amount of the particles, x_max=max(|v(a, b, $T_x$)|) in the x direction and the maximum movement amount of the particles, y_max=max (|v(a, b, T)$_y$|) in the y direction, and sets the minimum m and n among m and n satisfying inequalities (9) and (10). In other words, the flow velocimeter system considers the maximum movement amount of the particles or the like and sets m and n so that the particles or the like after the movement are included in the searching region SR(a,b) (see Expression (13)) described later and the size of SR(a,b) becomes the minimum.

$$-\frac{m}{2} < \text{x\_max} < \frac{m}{2} \quad (9)$$

$$-\frac{n}{2} < \text{y\_max} < \frac{n}{2} \quad (10)$$

The subscript letters such as x and y represent the values of the components as indicated in Expressions (11) and (12).

$v(a,b,t)_x$: value of $x$ component of local flow velocity vector $v$ (11)

$v(a,b,t)_{x,y}$: value of $x$ component or $y$ component of local flow velocity vector $v$ (12)

As a result, as the processing proceeds, unnecessary calculation can be reduced because the size of the inspection region approaches the optimum size in view of the movement amount of the particles or the like.

The image analysis device 30 calculates a correlation function $C(\alpha,\beta)$ of the brightness distribution of the first inspection region in the first image, $I^1(i+d(a-1),j+d(b-1))$ ($1 \le i \le m$, $1 \le j \le n$) and the brightness distribution of the second inspection region in the second image, $I^2(i+d(a-1)+\alpha, j+d(b-1)+\beta)$ (($1 \le i \le m$, $1 \le j \le n$) for all of the first inspection regions $R^1(a,b)$ included in the first image in the range of $-m/2<\alpha<m/2$ and $-n/2<\beta<n/2$ (FIG. 3/STEP032).

Figure 8B:
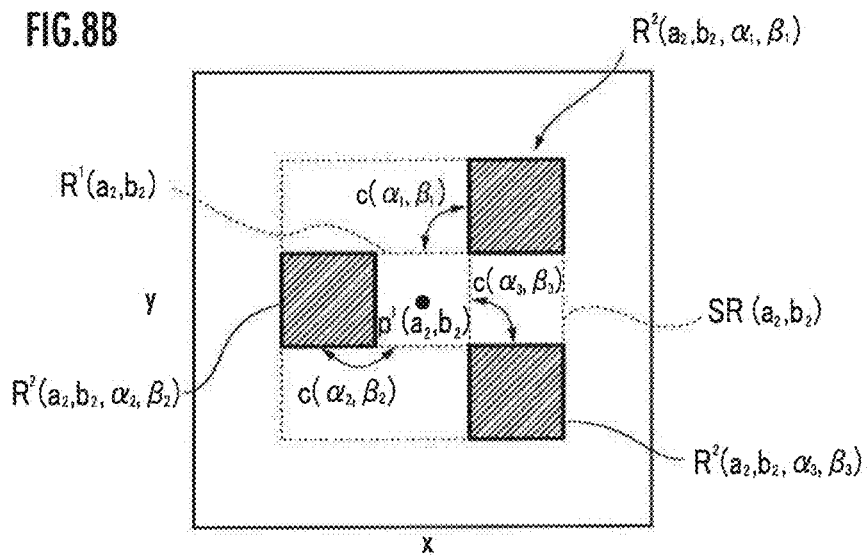
FIG. 8B describes the calculation of a correlation function.

More specifically, as illustrated in FIG. 8B, the flow velocimeter system finds the correlation function $C(\alpha,\beta)$ having, as the output, correlation values $c(\alpha_1, \beta_1)$, $c(\alpha_2, \beta_2)$ and $c(\alpha_3, \beta_3)$ . . . between a certain first inspection region $R^1(a_2,b_2)$ and the second inspection regions $R^2(a_2, b_2, \alpha_1, \beta_1)$, $R^2(a_2, b_2, \alpha_2, \beta_2)$ and $R^2(a_2, b_2, \alpha_3, \beta_3)$ included in the searching region SR($a_2,b_2$) that is determined corresponding to the first inspection region $R^1(a_2,b_2)$.

Herein, the searching region SR($a_2,b_2$) is the range that can be represented by Expression (13), for example.

$$SR(a_2, b_2) = (i + dx(a_2 - 1), j + dy(b_2 - 1)) \text{ where} \quad (13)$$
$$-\frac{m}{2} \le i \le \frac{3m}{2}, -\frac{n}{2} \le j \le \frac{3n}{2}$$

Herein, the correlation function $C(\alpha,\beta)$ is represented by Expression (14), for example.

$$C(\alpha, \beta) = \sum_{i=1}^{m}\sum_{j=1}^{n} I^1(i+d(a_2-1), j+d(b_2-1)) \quad (14)$$
$$I^2(i+d(a_2-1)+\alpha, j+d(b_2-1)+\beta)$$

For the calculation of the correlation function $C(\alpha,\beta)$, FFT processing is performed to the first inspection region $R^1(a_2,b_2)$ and the second inspection region $R^2(a_2,b_2,\alpha,\beta)$ for each of the vertical direction (y direction) and the horizontal direction (x direction) as illustrated in FIG. 9. Then, the brightness distribution characteristic of the first inspection region $R^1(a_2,b_2)$ and the brightness distribution characteristic of the second inspection region $R^2(a_2,b_2,\alpha,\beta)$, which are acquired by the FFT processing, are compared. In this way, the correlation function $C(\alpha,\beta)$ can be calculated.

Figure 10A:
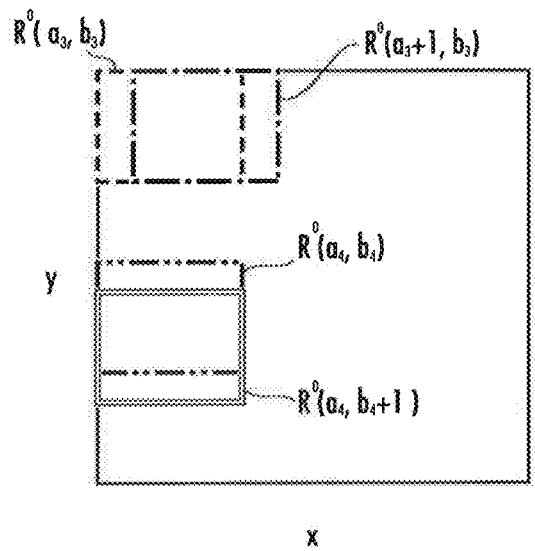
FIG. 10A, FIG. 10B, and FIG. 10C describe a part where FFT processing can be omitted for the brightness distribution at the inspection regions.

Since the adjacent inspection regions are overlapped partially, the FFT processing result for such an overlapping part is preferably reused. For instance, as illustrated in FIG. 10A, the flow velocimeter system reuses the FFT processing result at the inspection region $R^0(a_3,b_3)$ or $R^0(a_4,b_4)$ for the FFT processing of the inspection region $R^0(a_3+1,b_3)$ or $R^0(a_4,b_4+1)$) adjacent to the inspection region $R^0(a_3,b_3)$ or $R^0(a_4,b_4)$.

Figure 10B:
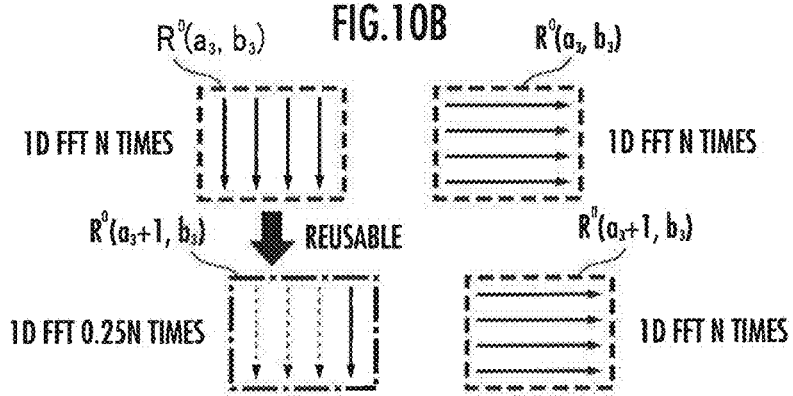

As illustrated in FIG. 10B, after the FFT processing is executed for the inspection region $R^0(a_3,b_3)$, FFT processing is executed as follows for the inspection region $R^0(a_3+1,b_3)$ that is displaced to the right (+x direction) by 0.25 times the width of the inspection region $R^0(a_3,b_3)$. The FFT processing in the y direction (see left side of FIG. 10B) can calculate the y-direction component of the flow velocity vector and the FFT processing in the x direction (see right side of FIG. 10B) can calculate the x-direction component of the flow velocity vector. In this case, the result of the FFT processing in the y direction relating to the overlapping region (accounting for 75% of the entire) with the inspection region $R^0(a_3,b_3)$ is applied to the inspection region $R^0(a_3+1,b_3)$, whereby the FFT processing in the y direction of such an overlapping region can be omitted.

Figure 10C:
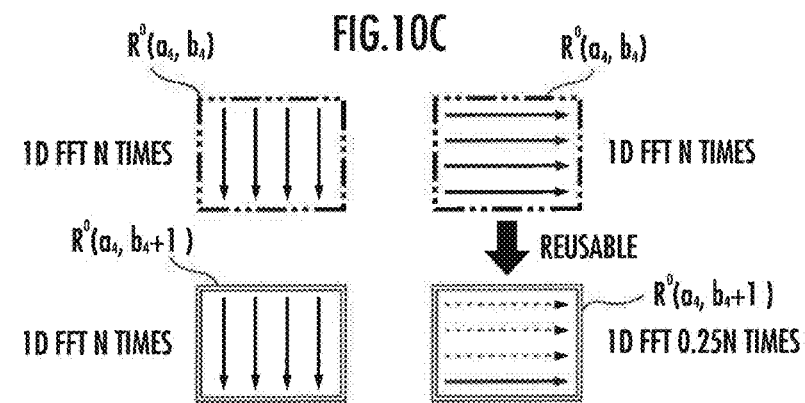

As illustrated in FIG. 10C, after the FFT processing is executed for the inspection region $R^0(a_4,b_4)$, FFT processing is executed as follows for the inspection region $R^0(a_4+1,b_4)$ that is displaced downward (+y direction) by 0.25 times the height of the inspection region $R^0(a_4,b_4)$. The FFT processing in the y direction (see left side of FIG. 10C) can calculate the y-direction component of the flow velocity vector and the FFT processing in the x direction (see right side of FIG. 10C) can calculate the x-direction component of the flow velocity vector. In this case, the result of the FFT processing in the x direction relating to the overlapping region (accounting for 75% of the entire) with the inspection region $R^0(a_4,b_4)$ is applied to the inspection region $R^0(a_4,b_4+1)$, whereby the FFT processing in the x direction of such an overlapping region can be omitted.

Such reusing of the FFT processing result can reduce the amount of calculation during the processing roughly represented by Expression (15) as compared with the case of not reusing the FFT processing result.

$$\frac{1}{2}\left(\frac{m-d_x}{m} + \frac{n-d_y}{n}\right) \quad (15)$$

The flow velocimeter system finds the set of $\alpha_0$ and $\beta_0$ such that the thus found correlation function $C(\alpha,\beta)$ yields the maximum $c_{max}(\alpha_0,\beta_0)$. The second inspection region $R^2(a_2,b_2,\alpha_0,\beta_0)$ yielding the maximum correlation function $C(\alpha,\beta)$ with the first inspection region $R^1(a_2, b_2)$ can be considered to include the image of the particles that is the same or has the same arrangement as those of the image of the particles included in the first inspection region $R^1(a_2, b_2)$.

Figure 8C:
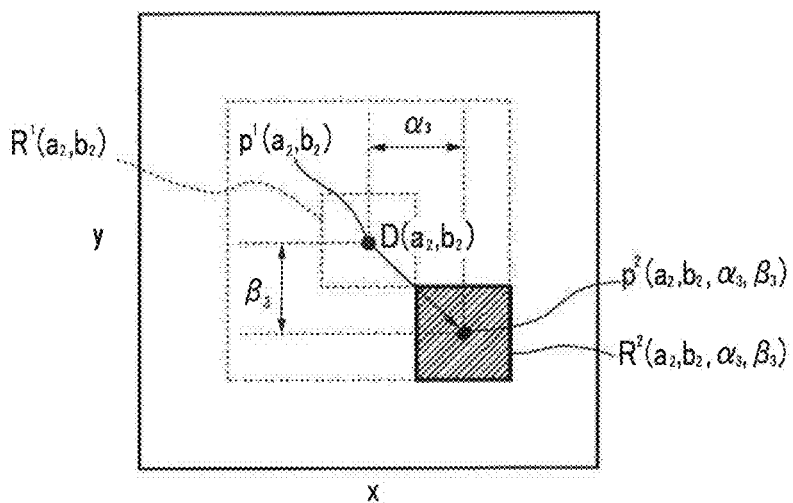
FIG. 8C describes the calculation of a flow velocity vector.

When $\alpha_0=a_3$, $\beta_0=\beta_3$, as illustrated with the moving vector $D(a,b)$ in FIG. 8C, the particles or the like existing on the real space coordinate system corresponding to the first inspection region $R^1(a_2,b_2)$ at the time T presumably moves to the position on the real space coordinate system corresponding to the second inspection region $R^2(a_2, b_2, \alpha_3, \beta_3)$ by the time $T+\Delta T$.

That is, the flow velocity vector $v(a_2, b_2, T)$ in the first inspection region $R^1(a_2,b_2)$ at the time T can be found by Expression (16).

$$v(a_2, b_2, T) = \left(\frac{D(a_2, b_2)}{\Delta T}\right) = \begin{pmatrix} \frac{\alpha_0}{\Delta T} \\ \frac{\beta_0}{\Delta T} \end{pmatrix} \quad (16)$$

Repeating the procedure at STEP032 allows the flow velocity vector $v(a, b, T)$ at the time T in each of the first inspection regions $R^1(a,b)$ to be acquired.

The flow velocimeter system makes the image analysis device 30 to perform the processing to correct the flow velocity vector $v(a, b, T)$ that can be considered as a measurement error, while considering the flow velocity vector $v(a_\pm, b_\pm, T)$ of the first inspection region $R^1(a_\pm,b_\pm)$ around the first inspection region $R^1(a,b)$ on the basis of the flow velocity vector $v(a, b, T)$ in the first inspection region $R^1(a,b)$ at the time T (FIG. 3/STEP040).

More specifically, determination is made as to whether each component $v(a, b, T)_{xy}$ of the flow velocity vector $v(a, b, T)$ in the first inspection region $R^1(a,b)$ at the time T satisfies a condition (a spatial error correction condition) that is determined from each component $v(a, b, T)_{xy}$ of the flow velocity vector $v(a_\pm, b_\pm, T)$ of the surrounding first inspection region $R^1(a_\pm, b_\pm)$. The spatial error correction condition that can be used includes that each component $v(a, b, T)_{xy}$ of the flow velocity vector $v(a, b, T)$ is not included in a predetermined range (e.g., the range that is determined using dispersion) that is determined from the median value or the average of each component $v(a_\pm, b_\pm, T)_{xy}$ of the flow velocity vector $v(a_\pm, b_\pm, T)$ in the surrounding first inspection region $R^1(a_\pm, b_\pm)$.

When the flow velocity vector $v(a, b, T)$ satisfies the spatial error correction condition, each component $v(a, b, T)_{xy}$ of the flow velocity vector of the first inspection region $R^1(a_\pm, b_\pm)$ is replaced with each component $v(a_\pm, b_\pm, T)_{xy}$ of the surrounding flow velocity vector. For instance, the weighted average of the components $v(a_\pm, b_\pm, T)_{xy}$ of the surrounding flow velocity vector is used as each component $v(a, b, T)_{xy}$ of the flow velocity vector of the first inspection region $R^1(a_\pm, b_\pm)$.

The flow velocimeter system determines whether the image analysis device 30 performs the processing of STEP030 to STEP040 to all images or not (or whether there are images at the next time (third time and fourth time) of the first time T and the second time $T+\Delta T$ or not) (FIG. 3/STEP050). When the determination result is negative (FIG. 3/STEP050 . . . NO), the flow velocimeter system continues the processing of STEP030 to STEP040 while setting the third time as a new first time T.

Figure 12A:
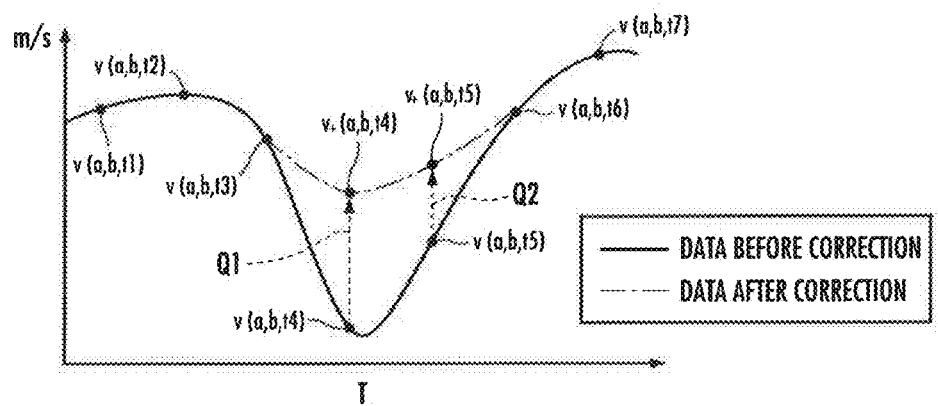
FIG. 12A describes the correction of each flow velocity vector in the time-series error correction processing.

The processing at FIG. 3/STEP030 to STEP050 yields the flow velocity vector $v(a, b, T)$ in the first inspection region $R^1(a,b)$ at the time T as indicated with the solid line in FIG. 12A.

When the determination result is affirmative (FIG. 3/STEP050 . . . YES), the flow velocimeter system performs time-series error correction processing by the image analysis device 30 (FIG. 3/STEP060).

The time-series error correction processing is to correct a target flow velocity vector $v(a, b, T)$ in the first inspection region $R^1(a,b)$ at the time T indicated with the solid line in FIG. 12A to a target flow velocity vector $v_+(a, b, T)$ in the first inspection region $R^1(a,b)$ at the time T indicated with the dashed line in FIG. 12A while considering a reference flow velocity vector $v(a, b, T_\pm)$ in the first inspection region $R^1(a,b)$ at the time $T_\pm$ before and after the time T.

Herein, $T-WL(s)/2 \leq T_\pm \leq T+WL(s)/2$, and $WL(s)$ denotes the window length.

Following that, the flow velocimeter system performs the processing for the component $v(a, b, T)_{xy}$ of each axis (e.g., x axis of the flow velocity vector of the particle group) of the flow velocity vector $v(a, b, T)$.

The flow velocimeter system initializes a certain time T (FIG. 11/STEP061).

The flow velocimeter system set the window at the certain time T (FIG. 11/STEP062).

Figure 13:
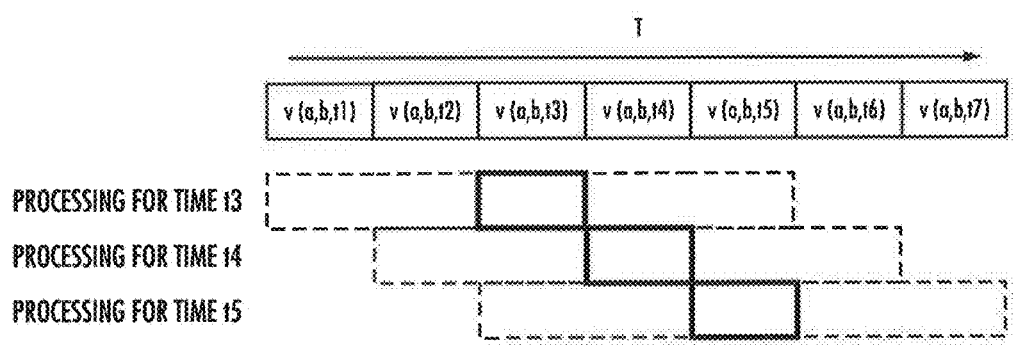
FIG. 13 describes window setting in the time-series error correction processing.

When the window length $WL(s)$ is 5, then as illustrated in FIG. 13, the five flow vectors (in the case of $T=t_3$, $v(a, b, t_1)$ to $v(a, b, t_5)$) before and after the time T (in the case of $T=t_3$, time $t_1, t_2, t_3, t_4$ and $t_5$) are used in the following processing.

Next, the flow velocimeter system defines various types of parameters for condition determination (FIG. 11/STEP063). Specifically the parameters are defined by Expressions (17) and (18).

$v\_rms_{xy}$: root mean square (rms) of each component of local flow velocity vector in window (17)

$v\_mid_{xy}$: median value of each component of each local flow velocity vector in window (18)

Next, the flow velocimeter system determines whether the target flow velocity vector $v(a, b, T)$ in the first inspection region $R^1(a,b)$ at time T satisfies the time-series error correction condition or not (FIG. 11/STEP064). Specifically the determination is made as to whether inequality (19) is satisfied or not.

$(v(a,b,t)_{xy}-v\_mid_{xy})^2 > 2v\_rms_{xy}^2$ (19)

Herein, the left side of the inequality (19) corresponds to the "degree of difference" of the present invention, and the right side of the inequality (19) corresponds to the "threshold" of the present invention. In this way, the threshold is determined corresponding to the value of component of each flow velocity vector in the window, whereby the degree of difference of the flow velocity vector can be determined flexibly on the basis of the mode of the flow velocity vector at the times before and after the time t as compared with the case where the threshold is determined beforehand.

The degree of difference and the threshold are not limited to the above expressions, and a difference between $v(a, b, T)_{xy}$ and the average of other flow velocity vectors in the window, for example, may be used as the degree of difference, and a value that is determined by an experiment beforehand may be used as the threshold.

When the result of the determination is No (FIG. 11/STEP064 . . . NO), the flow velocimeter system does not correct the target flow velocity vector v(a, b, T)(velocity data) at the time T and proceeds to the next processing.

For instance, as illustrated in FIG. 12A and FIG. 13, when it is determined that the target flow velocity vector v(a, b, $t_3$) at the time $t_3$ does not satisfy the inequality (19) while considering the reference flow velocity vectors v(a, b, $t_1$), v(a, b, $t_2$), v(a, b, $t_4$) and v(a, b, $t_5$) at $t_1$, $t_2$, $t_4$ and $t_5$ before and after the time $t_3$, the flow velocimeter system does not change the value of the flow velocity vector v(a, b, $t_3$) and proceeds to the processing at the next time $t_4$.

When the result of the determination is Yes (FIG. 11/STEP064 . . . YES), the flow velocimeter system corrects the target flow velocity vector v(a, b, T) using the weighted average of each component of the reference flow velocity vectors v(a, b, $T_\pm$) at other times in the window (e.g., by increasing the weighting coefficient of the reference flow velocity vectors at times T−1 and T+1 close to the time T and decreasing the weighting coefficient of the reference flow velocity vectors at times T−2 and T+2 that are away from the time T) (FIG. 11/STEP065). Specifically the target flow velocity vector v(a, b, T) is corrected by Expression (20), for example.

$$v(a, b, T)_{xy} \leftarrow \frac{\frac{1}{2}v(a, b, T-2)_{xy} + v(a, b, T-1)_{xy} + v(a, b, T+1)_{xy} + \frac{1}{2}v(a, b, T+2)_{xy}}{\frac{1}{2} + 1 + 1 + \frac{1}{2}} \quad (20)$$

For instance, when it is determined that the target flow velocity vector v(a, b, $t_4$) at the time $t_4$ satisfies the inequality (19) while considering the reference flow velocity vectors v(a, b, $t_2$), v(a, b, $t_3$), v(a, b, $t_5$) and v(a, b, $t_6$) at $t_2$, $t_3$, $t_5$ and $t_6$ before and after the time $t_4$, the flow velocimeter system corrects the flow velocity vector v(a, b, $t_4$) to $v_+$(a, b, $t_4$) by Expression (20) as indicated with the arrow Q1 in FIG. 12A.

Then, the flow velocimeter system uses the flow velocity vector $v_+$(a, b, $t_4$) after correction in the processing at the time $t_4$ or later. For instance, when it is determined that the flow velocity vector v(a, b, $t_5$) at the time $t_5$ satisfies the inequality (19) while considering the reference flow velocity vectors v(a, b, $t_3$), v(a, b, $t_4$) (after correction), v(a, b, $t_6$) and v(a, b, $t_7$) at $t_3$, $t_4$, $t_6$ and $t_7$ before and after the time $t_5$, the flow velocimeter system corrects the flow velocity vector v(a, b, $t_5$) to $v_+$(a, b, $t_5$) by Expression (20) as indicated with the arrow Q2 in FIG. 12A.

Figure 12B:
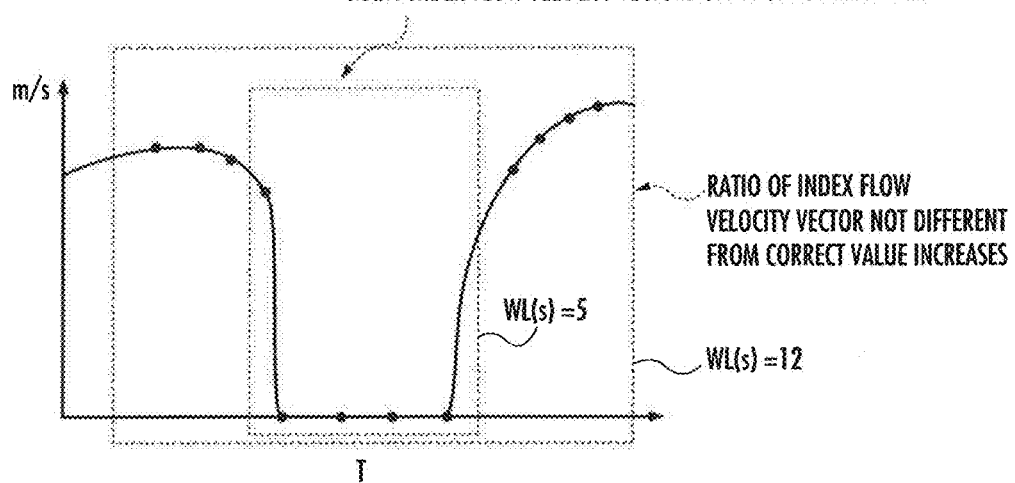
FIG. 12B describes a change in window length in the time-series error correction processing.

The flow velocimeter system may determine before the processing at FIG. 11/STEP065 whether the ratio of the reference flow velocity vectors v(a, b, $T_\pm$) satisfying the condition represented by the inequality (19) to the entire reference flow velocity vectors v(a, b, $T_\pm$) (hereinafter this is called "satisfying ratio of inequality (19)") is a predetermined ratio (e.g., 40%) or more. When the satisfying ratio of inequality (19) is the predetermined ratio or more, the flow velocimeter system increases the window length WL(s) until the satisfying ratio of inequality (19) becomes less than the predetermined ratio, and then may perform the processing at FIG. 11/STEP063 to STEP065. As illustrated in FIG. 12B, this can increase the ratio of the reference flow velocity vectors that are likely to be accurate due to the increased window length WL(s) when the satisfying ratio of inequality (19) of the reference flow velocity vectors is high, i.e., when there are many reference flow velocity vectors that are likely to be noise. As a result, the target flow velocity vector can be corrected more suitably from the viewpoint of bringing it to the correct value.

The flow velocimeter system determines whether the processing is performed for all of the times T or not (FIG. 11/STEP066). When the result of the determination is No, the flow velocimeter system increases T by 1 (FIG. 11/STEP067) and repeats the processing at STEP062 to STEP065. When the result of the determination is Yes, the flow velocimeter system finishes the time-series error correction processing.

The flow velocimeter system may be configured so as to determine, before or after the processing at FIG. 11/STEP066 at time T, whether the correction ratio of flow velocity vectors in a part or all of the past duration (e.g., time T−γ to time T(γ>0)) including the time T is a predetermined value or more (e.g., the correction ratio of the flow velocity vector during the duration is 5% or more), and when the result of the determination is Yes, to execute the processing at STEP061 to STEP067 during the duration repeatedly. When the correction ratio of the flow velocity vectors is high, original data includes a lot of flow velocity vectors (noise) being likely to be a measurement error, and so the data after correction also is likely to include a lot of noise remaining. In such a case, the processing at STEP061 to STEP067 repeatedly executed can decrease the remaining ratio of the noise.

Even when the correction ratio of flow velocity vectors during certain duration is a predetermined value or less, this may be the case where the correction ratio of flow velocity vectors during duration shorter than the certain duration is high, i.e., where noise concentrates locally.

In view of this, the flow velocimeter system may be configured so that the predetermined value increases with decreases in the length of the duration (e.g., the predetermined value is a first predetermined value (e.g., 5%) during past first duration (time T−γ1 to time T(γ1>0)), and is a second predetermined value (e.g., 10%) higher than the first predetermined value during second duration (time T−γ2 to time T(γ1>γ2>0)) shorter than the first duration. The first duration may be the past entire duration.

As a result, the processing at STEP061 to STEP067 is executed repeatedly only during the duration having an especially high correction ratio of flow velocity vectors, and so the probability of local concentration of noise can be decreased while suppressing an increase in the load for the processing.

After the time-series error correction processing (FIG. 3/STEP060), the flow velocimeter system finishes a series of the processing.

(Advantageous Effects of the Flow Velocimeter System)

According to the thus configured flow velocimeter system, a light sheet is generated at a designated region, and images of fluid flowing through the designated region are formed at a plurality of different times. For each of a plurality of inspection regions making up the images, when a flow velocity vector v(a, b, T) at a certain time T is different from a flow velocity vector (reference flow velocity vectors) v(a, b, $T_\pm$) at one or a plurality of times $T_\pm$ that is different from the certain time T beyond a threshold v_rms, the flow velocity vector v(a, b, T) at the certain time T is corrected (FIG. 11/STEP064 . . . YES→STEP065, see inequality (19) and Expression (20)). As a result, a flow velocity vector v(a, b, T) that is likely to be noise different from the original form can be corrected closer to the original form. Then, the accuracy of measurement of time-series or changing mode of the fluid velocity can be improved.

Figure 14A:
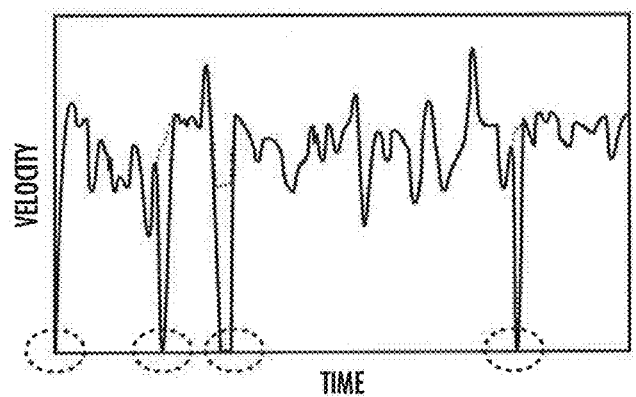
FIG. 14A illustrates a time-series changing mode of original data and a flow velocity vector of fluid before the time-series error correction processing.
Figure 14B:
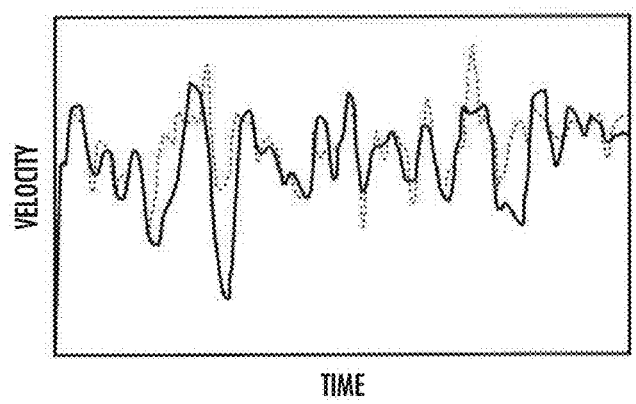
FIG. 14B illustrates a time-series changing mode of original data and a flow velocity vector of fluid after the conventional time-series error correction processing.
Figure 14C:
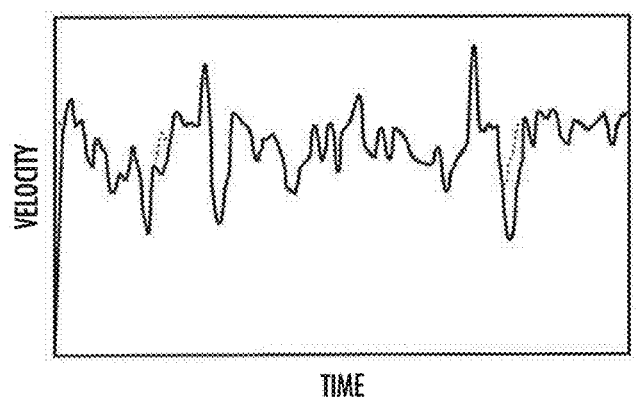
FIG. 14C illustrates a time-series changing mode of original data and a flow velocity vector of fluid after the time-series error correction processing of the present embodiment.

Specifically FIG. 14A illustrates original data (dotted line) and data before the time-series error correction processing (solid line). FIG. 14B illustrates original data (dotted line) and data after the time-series error correction processing by the technique described in Patent Document 1 (solid line). FIG. 14C illustrates original data (dotted line) and data after the time-series error correction processing according to the present embodiment (solid line).

As FIG. 14A to FIG. 14C show, the data after the time-series error correction processing by the conventional technique (see FIG. 14B) is decreased in a part of the data that is extremely off from the original data, but the data as a whole is rather different from the original data. On the other hand, the data after the time-series error correction processing according to the present embodiment (solid line) includes error data decreased, and the reproducibility of the original data can be increased as a whole. That is, the flow velocimeter system that is one embodiment of the present invention can improve the time-series measurement accuracy of the fluid velocity.

Brightness of all pixels making up a predetermined range that is at least a part of the formed image is corrected (FIG. 3/STEP022, see FIG. 4 and FIG. 5). This enables clear discrimination of the brightness resulting from the border between particles included in the fluid or making up the fluid and the background light and the brightness resulting from the scattered light of the particles (see FIG. 6B upper side). That is, the measurement accuracy of a time-series correlation of the region including the particles in the formed image can be improved, and accordingly the time-series measurement accuracy of the fluid velocity can be improved (see FIG. 6B lower side).

For the calculation of the correlation function $C(\alpha,\beta)$, when there is an overlapped region in one inspection region and in another inspection region among the plurality of inspection regions, a result of the fast Fourier transformation processing at the other inspection region is applied to the overlapped region for the fast Fourier transformation at the one inspection region (see FIG. 9A and FIG. 9B as well as FIG. 10A to FIG. 10C). This can save the calculation resource for the fast Fourier transformation processing (FFT processing) in the overlapped region between the plurality of inspection regions. This means that the fluid velocity having a high pixel density of the image also can be measured effectively in a time-series manner, and so the measurement accuracy can be further improved.

The threshold v_rms can be determined adaptively corresponding to the reference flow velocity vector $v(a, b, T_{\pm})$, and so the time-series measurement accuracy of the fluid velocity can be further improved.

When the occupancy of different flow velocity vectors (reference flow velocity vectors that do not satisfy the inequality (19)) among the reference flow velocity vectors $v(a, b, T_{\pm})$ at the plurality of times exceeds a predetermined value, the number of the reference flow velocity vectors $v(a, b, T_{\pm})$ are corrected for increasing by correcting the window length WL(s) for increasing so that the occupancy becomes the predetermined value or less. Then, the flow velocity vector $v(a, b, T)$ at each time T can be corrected suitably based on the reference flow velocity vector $v(a, b, T_{\pm})$ that is likely not to correspond to noise or to correspond to the true value, and so the time-series measurement accuracy of the fluid velocity can be improved.

What is claimed is:

1. A flow velocimeter system comprising:
a light-sheet generation device;
an imaging device; and
an image analysis device including a processor, the image analysis device being configured to measure, based on images of fluid flowing through a designated region that are formed a plurality of times at different times by the imaging device while the light-sheet generation device generates a light sheet continuously or intermittently at the designated region, a time-series changing mode of a local flow velocity vector of the fluid at each of a plurality of inspection regions defined at the images in accordance with a cross correlation method,
wherein the image analysis device is configured to, for an inspection region of the plurality of inspection regions that has a degree of difference exceeding a threshold between the local flow velocity vector at a certain time and a reference flow velocity vector as the local flow velocity vectors at one or a plurality of times that is different from the certain time, correct the local flow velocity vector at the certain time with the reference flow velocity vector,
wherein the image analysis device is configured to, when occupancy of different flow velocity vectors among the reference flow velocity vectors at the plurality of times exceeds a predetermined value, increase the number of the reference flow velocity vectors so that the occupancy becomes the predetermined value or less, and
wherein the different flow velocity vectors are the reference flow velocity vectors at one time of the plurality of times, which have a degree of difference from the reference flow velocity vectors at another time that exceeds the threshold.

2. The flow velocimeter system according to claim 1, wherein the image analysis device is configured to correct brightness of all pixels making up a predetermined range that is at least a part of the images based on brightness of a pixel as a part making up the predetermined range, and then calculate the local flow velocity vector at each of the plurality of inspection regions.

3. The flow velocimeter system according to claim 1, wherein the image analysis device is configured to execute fast Fourier transformation processing at each of the plurality of inspection regions, thus calculating the local flow velocity vectors, and when there is an overlapped region in one inspection region and in another inspection region among the plurality of inspection regions, to apply a result of the fast Fourier transformation processing at the other inspection region to the overlapped region for the fast Fourier transformation at the one inspection region.

4. The flow velocimeter system according to claim 1, wherein the image analysis device uses a value that is determined in accordance with the reference flow velocity vector as the threshold.

* * * * *